PERIODICALLY EXCITED CRYSTAL REFERENCE SIGNAL CIRCUIT FOR A COLOR DEMODULATOR

Filed Oct. 31, 1966

Inventors
George W. Fyler
Frank D. Kot
By Francis W. Crotty
Attorney

United States Patent Office 3,475,550
Patented Oct. 28, 1969

3,475,550

PERIODICALLY EXCITED CRYSTAL REFERENCE SIGNAL CIRCUIT FOR A COLOR DEMODULATOR

George W. Fyler, Lombard, and Frank D. Kot, Chicago, Ill., assignors to Zenith Radio Corporation, Chicago, Ill., a corporation of Delaware Filed Oct. 31, 1966, Ser. No. 590,792
Int. Cl. H04n 5/44
U.S. Cl. 178—5.4 5 Claims

ABSTRACT OF THE DISCLOSURE

In a color receiver the reference signal for the color demodulator is developed in a network including a piezoelectric crystal having a ringing frequency corresponding to the desired reference frequency. This resonant network is in the output of a gated burst amplifier which is gated to apply the color sync burst signal to the crystal. The Q of the crystal is sufficiently high that the signal it generates, in response to excitation by the color burst, is frequency synchronized and phase locked to the color burst and is of substantially constant amplitude throughout the intervals between such bursts.

Figures 1, 2:
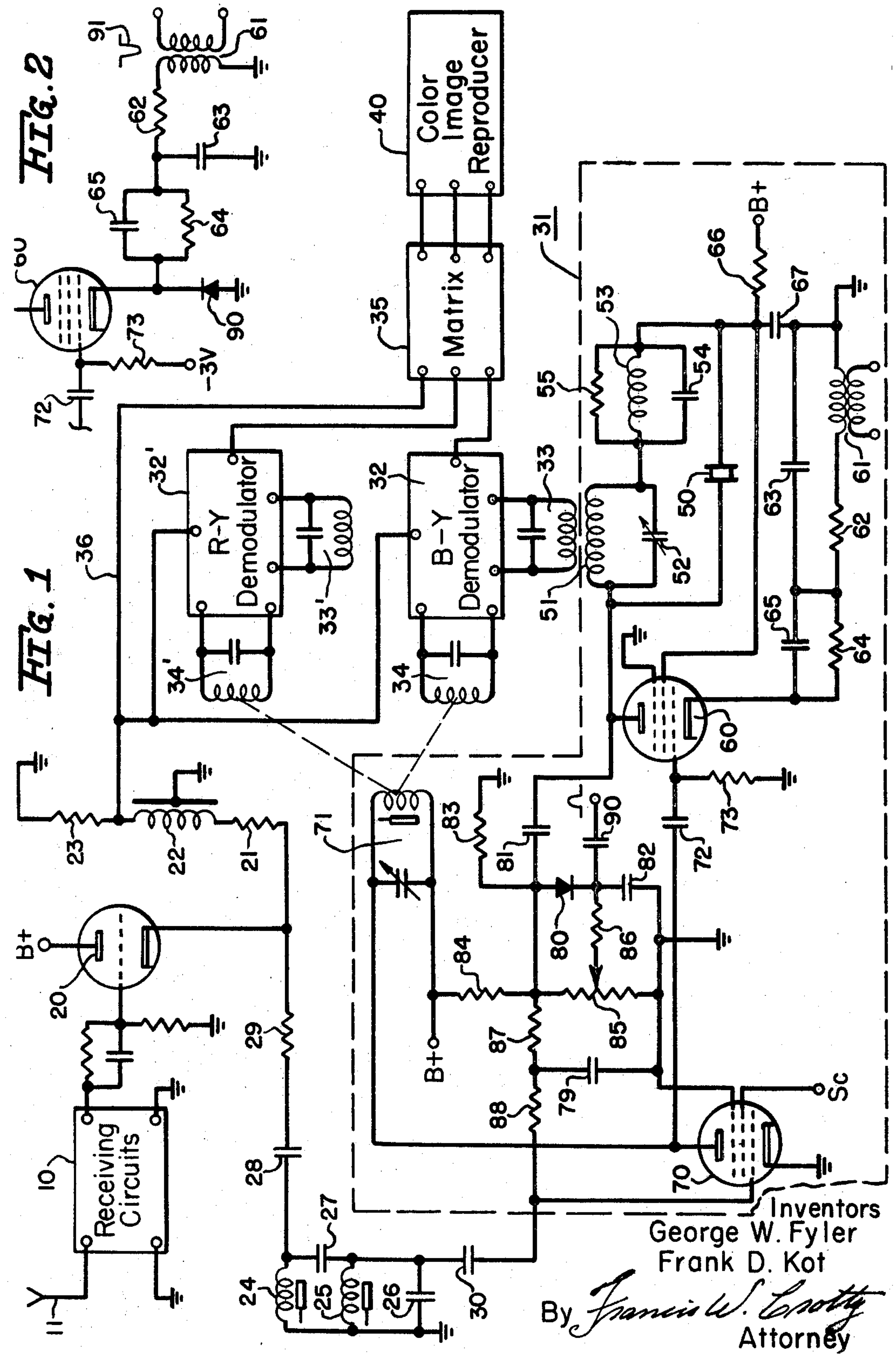

The present invention concerns signal processing apparatus for color television receivers with particular regard to the chroma channel. The invention is especially concerned with the reference signal source characteristically included in the chroma portion of a color receiver and while of general utility in color receivers, it is uniquely suited for one of the type described and claimed in a concurrently filed application of George W. Fyler, Ser. No. 590,793, assigned to the assignee of the present invention.

As explained in the Fyler application, a color telecast features a composite color television signal having a luminance component Y which represents brightness information of an image being transmitted, a chroma component in the form of a subcarrier modulated with color information of that image, and a color sync component in the form of periodically recurring bursts of energy of a reference frequency corresponding to the fundamental frequency of the chroma modulated signal. In utilizing the program signal of a colorcast, it is necessary to process the chroma signal and derive from it three color control signals which, in conjunction with the luminance signal, control a color image reproducing device to synthesize an image in simulated natural color.

Processing of the chroma signal involves demodulation and it is well known that a variety of color control signals may be obtained by demodulating the chroma signal at various phase angles. More specifically, the chroma signal may be demodulated at one phase angle to derive the blue color difference signal $B-Y$. If a second demodulator concurrently demodulates the chroma signal at a phase that is displaced approximately 90° from the first demodulator, the red color difference signal $R-Y$ is obtained. Having available these color difference signals as well as the luminance signal Y, they may be matrixed to obtain the green color difference signal $G-Y$. Where this approach is followed, the color difference signals may be applied to the grids and the luminance signal to the cathodes of the three electron guns of the popular three gun shadow mask tube. Internal matrixing is accomplished within the tube to the end that each of its three beams is controlled in accordance with an assigned one of three primary color signals.

The Fyler application follows a different approach. It employs two color difference demodulators and an active matrix having three amplifying tubes although transistor amplifiers are equally useful. Each of the two demodulators floats between the grid of an assigned one of the amplifier tubes and the luminance signal source. Accordingly, the signals applied to such grids are the red and blue primary color signals, respectively. The luminance signal is directly applied to the signal grid of the remaining amplifier and a matrix impedance common to all three amplifiers provides matrixing to develop the green primary color signal. After amplification, the three primary color signals are applied to the control grids or to the cathodes of the three gun color tube. This approach has desirable simplification and other distinct advantages attributable to the fact that it features low level demodulation.

In both approaches, however, it is necessary that each color demodulator be supplied with the chroma signal to be processed and also with a reference signal that is frequency synchronized and phase locked at a particular phase angle at the fundamental component of the chroma signal. This necessary condition is established by controlling the reference signal source with the color sync component of a received colorcast. Frequently, the reference signal source is a crystal controlled oscillator and such devices operate satisfactorily in injecting the necessary reference signal into the color demodulators although they do represent a complication and expense that should be avoided, if possible, in simplifying the receiver structure.

Efforts towards such simplification have already been made and take the form of a ringing circuit which is resonant at the reference frequency and synchronized by the application of the color synch or burst information of the received signal. Illustrative examples are disclosed in U.S. Patent No. 2,875,272 issued to Cuccia, Feb. 24, 1959 and U.S. Patent No. 2,890,272 issued to Machovski, June 9, 1959. As indicated in these patents, however, it has been customary to interpose an amplifier between the ringing circuit and the color demodulator and to have some type of control to assure constant amplitude of the reference signal as applied to the demodulators in spite of the fact that the reference signal results from pulse excitation of the ringing circuit. The present invention is a further simplification over those arrangements in that the need for the intervening amplifier and control arrangements is avoided.

Accordingly it is an object of the invention to provide a novel signal processing apparatus for a color television receiver, particularly directed to the chroma portion of such apparatus.

Another specific object of the invention is to simplify that portion of the color signal processing apparatus of a color receiver which is associated with a reference signal supply source.

Signal processing apparatus of a color receiver constructed in accordance with the invention comprises a color demodulator for demodulating the chroma signal. The demodulator has a tuned input circuit, including a coil, which is resonant to the frequency of the burst energy that constitutes the color sync signal of a composite television signal; this is referred to as the reference frequency. There is a network also resonant at the reference frequency and including a piezoelectric crystal having a ringing frequency which likewise corresponds to the reference frequency. The crystal is shunted by a coil inductively coupled to the demodulator coil. The apparatus further comprises a gated burst amplifier having an input circuit for receiving the composite color television signal and having an output circuit including the aforesaid resonant network. Finally there are means for gating the burst amplifier to apply only a color sync signal of the composite color signal to the crystal. The crystal has a Q sufficiently high to develop, in response to periodic excitation by the color sync signal, the necessary reference signal for application to the color demodulator. That signal is frequency synchronized and phase locked at a controllable phase angle to the color sync signal and, additionally, is of substantially constant amplitude during each line trace interval.

The features of the present invention which are believed to be novel are set forth with particularity in the appended claims. The invention, together with further objects and advantages thereof, may best be understood by reference to the following description taken in connection with the accompanying drawing, in which FIGURE 1 represents in schematic diagram form a color television receiver having a signal processing apparatus embodying the invention while FIGURE 2 shows a modification of one portion of that receiver.

The receiver depicted in FIGURE 1 is of the type disclosed in the Fyler application to which reference may be made for details of construction and operation. The discussion of that receiver, except for the portion of the chroma channel concerned with the present invention, will be confined to essentially a functional disclosure.

The receiver has the usual receiving circuits shown as a block 10 to which a receiving antenna 11 is coupled. These circuits would include the front end which is a tunable input for selecting any of the VHF and UHF television channels plus a unicontrolled heterodyning oscillator which supplies signals to a first detector to develop a suitable intermediate frequency signal. This tuned input is followed by stages of intermediate frequency amplification and a picture or video detector which supplies the signal processing apparatus comprised of the luminance and chrominance channels about which more will be said presently.

The receiving circuits not otherwise particularized also include a sound system for deriving an intercarrier sound component. After suitable detection and amplification the recovered audio energizes a loudspeaker. Additionally there is a synchronizing signal separator for controlling line and field sweep systems to energize the usual deflection yoke of a three gun shadow mask type tube to cause the three beams thereof to trace a recurring pattern of parallel lines in synchronism with a similar scanning process conducted at the transmitter in generating the broadcast signal. It is essential to assure convergence of the three beams at all points in the scanning raster and this is accomplished by both dynamic and static convergence assemblies. It is also common practice to provide auxiliary control systems such as an automatic gain control which maintains an approximately constant signal level to the video detector and an automatic frequency control for the heterodyning oscillator. These various components of the receiver are no part of the claimed invention and may be of known construction and operation.

The signal output of the picture detector is a composite color television signal having the luminance signal Y, having the chroma signal, and further having the color sync signal in the form of periodically recurring bursts of energy of the reference frequency. It is this output from the video detector which is operated upon in the signal processing apparatus to arrive at the final form of the signals required for controlling the color image reproducing device.

The signal processing apparatus is supplied from the video detector through a triode 20 arranged in the circuit of a cathode follower. The cathode circuit of triode 20 is branched and includes in one branch a resistor 21, a delay line 22 properly terminated in a resistor 23 connected to ground. For convenience of terminology and in particular to aid in understanding the various signal paths of the color processing apparatus, this branch of the cathode follower circuit may be thought as a luminance channel in which load impedance 23 may be denominated the luminance signal source. The second branch of the cathode circuit of triode 20 has a filter circuit which is selective to the chroma signal and has a passband sufficiently wide to accept only the significant modulation components of the chroma signal. This filter is a doubled-tuned coupled circuit. Its primary tuned circuit comprises an inductor 24 series tuned by a capacitor 28 and damped by a resistor 29. The secondary circuit comprises an inductor 25 shunt tuned by a capacitor 26 and the input capacitance of a tube 70. A capacitor 27 interposed between these two circuits determines the bandwidth. Tuning slugs indicated schematically may be associated with coils 24, 25. This filter delivers both the chroma signal and the color sync signal through a coupling capacitor 30 to an arrangement <u>31</u> to be described hereinafter.

Although three color demodulators may be employed, it is convenient to utilize a pair of demodulators in conjunction with an active matrix for developing the necessary three signals utilized in controlling the three gun color tube. One demodulator 32 is employed to develop the blue color difference signal $B-Y$. As explained in the Fyler application, it is in the form of an averaging synchronous diode detector to which both the chroma signal and a properly synchronized reference signal are applied. The demodulator has one tuned input 33 that is resonant to the frequency of the burst energy constituting the color sync signal of the received composite color television signal. It has another tuned circuit 34 which is tuned to the same frequency and has an acceptance bandwidth required to translate the significant modulation components of the chroma signal. Both the reference and chroma signals are applied to demodulator 32 from unit <u>31</u> by inductive coupling.

A second demodulator 32' derives the red color difference signal $R-Y$. Structurally, it is essentially the same as demodulator 32 and the corresponding portions thereof are identified by like reference numerals primed.

Following the demodulators is an active matrix 35 of the type described and claimed in U.S. Patent 3,180,928, issued Apr. 27, 1965, in the name of John L. Rennick, and assigned to the assignee of the present invention. It includes three amplifying devices which may be tubes or transistors although it is convenient for the present to assume the use of amplifying tubes. The control electrode of one tube is connected in series with Y signal source 23 by means of a connection 36. The control electrode of another of the amplifier tubes is likewise connected to luminance source 23 but through the load circuit of demodulator 32'. Similarly, the control electrode of the third tube is connected through the load circuit of demodulator 32 to luminance source 23. In short, each of the color difference demodulators floats with respect to source 23 of luminance signal Y in the input circuit of an assigned amplifying tube of matrix 35.

The output circuits of the matrix, where three primary color signals are present, connect with the input electrodes of assigned ones of the three gun shadow mask color tube 40.

The arrangement, as thus far described, is essentially that of the Fyler application and its overall operation in translating the composite color signal to develop an image in simulated natural color will be reviewed only briefly inasmuch as the details of structure and operation are recited in that application.

The composite color signal derived in the video detector of receiving circuits 10 is applied through triode 20 to both branches of its cathode network. The luminance signal Y is available across load impedance 23. The chroma signal and the color burst signal are separated from the remainder of the composite color signal by the filter in the other branch of the cathode circuit and are delivered to unit <u>31</u>. This unit, in a fashion to be particularized hereafter, responds and provides a properly synchronized and properly phased reference signal which is injected in proper relative phase into demodulators 32, 32' by way of inductive coupling with tuned circuits 33, 33'. Concurrently, the chroma signal is delivered to the demodulators through tuned circuits 34, 34'. The response of the demodulators to these applied signals is the development in the load circuit of demodulator 32 of the $B-Y$ color difference signal, and similarly, the development of the $R-Y$ color signal in the load circuit of demodulator 32'. Since each such load circuit is in series with the source 23 of luminance signal Y, the addition of the signals in the input circuits to the matrix results in the blue primary signal being present on the input grid of one amplifier of the matrix and the red primary signal being present on the input grid of a second tube of the matrix. At the same time, the Y signal alone is supplied to the grid of the third amplifier tube of that matrix. These three signals are matrixed in a common cathode matrix impedance and develop the green primary color signal. The three primary color signals are amplified in the matrix and are delivered to the color tube 40 to modulate the electron beams thereof while the beams are being scanned over the image area in the usual way to develop a color image.

More particular consideration will now be given to unit 31 and initially its circuitry for supplying a reference signal, that is to say a signal of the reference frequency of the color bursts, will be described. It comprises a resonant network including a piezoelectric crystal 50 having a ringing frequency corresponding to the reference frequency. The resonant network further includes a coil 51 in shunt to the crystal and inductively coupled to the coil of tuned input circuit 33 of demodulator 32. There is a capacitor 52 across coil 51 selected so that the network including elements 50–52 is resonant at approximately the reference frequency. It will also be observed that there is a second parallel resonant circuit in this network, comprised of the coil 53, a capacitor 54 and a resistor 55. This circuit is critically damped and is provided to attenuate and substantially eliminate a spurious resonance to be discussed hereafter.

The described network is, of course, passive and receives its energy through a gated burst amplifier including a pentode tube 60 having an output circuit which includes the aforedescribed resonant network. Its input circuit receives the portion of the composite color television signal that is selected by filters 24–27 and gating is relied upon to the end that only the color sync bursts are translated through tube 60 to the resonant network including crystal 50. For this purpose means are provided in the cathode circuit of tube 60 for gating the amplifier to respond only to the color sync bursts. As illustrated, this means comprises a transformer 61 through which gating pulses derived from the line scanning system of the receiver are delivered to an integrating network, comprising a resistor 62 and a capacitor 63, for shaping. The shaped pulse is applied to the cathode of tube 60 through a self biasing network provided by a resistor 64 and a shunt capacitor 65. Operating potential is supplied to tube 60 from a source B+ through a resistor 66 bypassed by a capacitor 67.

As stated, the color sync bursts are relied on to drive the resonant circuit including crystal 50. They are applied to the input of gated amplifier 60 by means of a single chroma amplifier comprising a second pentode tube 70 having a tuned output 71 which is resonant at the reference frequency and, of course, has the proper bandwidth for translating the significant modulation components of the chroma signal. The broken construction lines extending from resonant circuit 71 to tuned input 34, 34' of the color demodulators represent inductive coupling therebetween for applying the chroma signal to the demodulators with the proper relative intensities as explained in the Fyler application. The coupling from the single stage of chroma amplification to gated burst amplifier 60 is through a coupling capacitor 72 which connects to the input grid 60, this grid having the usual leak resistor 73.

It is desirable to include an automatic chroma control circuit to maintain approximately constant amplitude of the chroma and reference signals applied to the demodulators in the face of chroma modulation variations of the received program signal so as to maintain a uniform ratio of chroma versus luminance signal intensities. A gated delay-biased automatic chroma control circuit is employed, comprising a diode 80 coupled by means of a capacitor 81 to the load circuit of gated amplifier 60. The cathode of diode 80 is connected to ground through a capacitor 82 and its anode is grounded through a load resistor 83. A voltage divider network comprising a source +B, a resistor 84 and a potentiometer 85 applies a positive delay bias voltage of adjustable value through a resistor 86 to the cathode of diode 80. The negative control potential developed on resistor 83 in the ACC circuit by rectification of the ringing signal in the anode circuit of gated amplifier 60 varies in amplitude with variations in the color burst component of the received color signal. The control potential developed on resistor 83 is applied through a low pass filter comprising a resistor 87 and a capacitor 79, and through a decoupling resistor 88 to the input electrode of chroma amplifier 70.

It is preferable that the ACC voltage be derived solely from the ringing signal and not be influenced by noise occurring in the absence of burst within the gated interval, nor by transients resulting from the gating pulse itself. Accordingly, a blocking pulse of positive polarity also derived from the line scanning system is delivered through a capacitor 90 to the cathode of ACC diode 80, driving the diode to cut off at least for the duration of the gating-on interval of the burst amplifier.

The ultimate function of the described unit 31 is to respond to the portions of the composite color television signal selected by filter 24–27 and supply the necessary signals to demodulators 32, 32'. In performing this function, amplifier 70 amplifies the chroma signal and applies it to tuned inputs 34, 34' of demodulators 32, 32' by way of the coupling with tuned output 71 of the chroma amplifier. Additionally, the color bursts included in the composite color signal for synchronization purposes are amplified in the chroma amplifier and translated to gated amplifier 60. Obviously, the amplified chroma signal is likewise delivered to this tube but since the tube is gated on only during the time of occurrence of the color bursts, these bursts alone are translated to the resonant network constituting the load circuit of gated amplifier 60. They occasion ringing of crystal 50 and the development of a reference signal for application to demodulators 32, 32' through the coupling of coil 51 to coils 33, 33'. The phase of this reference signal is determined by the phase of the color bursts of the received signal and may be adjusted by means of a tuning core provided for coil 51 or by varying capacity 52. The crystal has a high Q and it has been determined that the ringing signal remains in a predetermined selected phase with respect to the color burst and its amplitude, which is also determined by the color burst, remains essentially constant throughout the line trace intervals which separate successive color bursts of the received signal.

Fourier analysis of the color bursts of the received signal establishes that they are equivalent to a steady carrier component of low amplitude plus sidebands located on either side of the carrier at multiples of the horizontal line rate. The crystal selectivity rejects all of the sidebands and in effect, the crystal is continuously driven by a constant amplitude sine wave generator of fixed phase. Thus, the crystal remains in constant phase and amplitude provided the load remains constant both in amplitude and phase throughout the line interval. To achieve this load characteristic, the demodulators are balanced as described in the Fyler application. It has been found that the energy of the reference signal required by the demodulators can be drawn from the ringing crystal throughout the line interval without perceptible decay in voltage amplitude or change in phase relative to the color bursts and regardless of color level. Since the burst amplifier 60 is gated off during the trace portion of each line in order to reject unwanted chroma information, the ringing voltage and power may be increased by operating the driving tube at high screen and high plate voltages. It is important that the tube be operated class A during conduction so that the ACC control potential developed from the crystal ringing voltage will vary directly with burst signal amplitude.

Unit 31 represents a dramatic simplification in the chroma circuitry of the color receiver. Its derivation stems from the discovery that energy with acceptable constancy of phase and amplitude may be drawn from the crystal circuit directly for application to a plurality of color demodulators, obviating the need of subsequent amplification and control circuitry characteristic of prior arrangements. As shown in the Fyler application, the reference signal may be injected into demodulator 32 by inductive coupling of circuits 33 and 51–52. Similarly, coupling between resonant circuits 33 and 33′ provides reference signal injection into demodulator 32′ in quadrature phase relative to that of demodulator 32. Moreover, a single chroma amplifier may be employed both for applying the chroma signal to the color demodulators and for delivering the color bursts for pulse excitation of the crystal circuit.

The resonant circuit including crystal 50 may exhibit a spurious resonance at a frequency other than the reference frequency at which the crystal rings. For example, in one constructed embodiment of the invention, the crystal ringing frequency was approximately 3.58 megacycles and it was observed that a spurious resonance occurred at about 1.7 megacycles. It manifests itself at the trailing edge of the driving color bursts and, unless eliminated, gives rise to vertical distortion bars on the left side of the reproduced image. The circuit 53, 54 is tuned to the spurious resonance and resistor 55 critically damps the overall anode circuit of amplifier 60 at this same frequency and attenuates the spurious oscillation rendering it unobjectionable.

Without confining the scope of the invention, the following are a list of parameters of one embodiment of unit 31 that has been constructed and found to operate successfully:

| | |
|---|---|
| Resistors: | |
| 55 | 1K. |
| 62 | 150 ohms. |
| 64 | 22K. |
| 66 | 5.6K. |
| 73 | 2.2 megohms |
| 83 | 220K. |
| 84 | 680K. |
| 85 | 100K. |
| 86 | 39K. |
| 87 | 560K. |
| 88 | 1 megohm. |
| Capacitors: | |
| 63, 65 | .022 microfarad. |
| 72, 79,, 82 | .01 microfarad. |
| 81 | 22 micro microfarad. |
| Resonant circuits: | |
| 50–52 | Tuned to 3.58 megacycles. |
| 53–54 | Tuned to 1.7 megacycles. |
| Tubes: | |
| 60 | Type 6JC6. |
| 70 | Type 6BZ6. |
| B supply 350 volts. | |

A modified form of gating for burst amplifier 60 is shown in FIGURE 2. In this arrangement, the cathode of tube 60 is returned to ground through a diode 90 while grid resistor 73 connects to a bias source of about −3 volts. The gating pulse 91 applied to diode 90 through transformer 61 causes the diode to conduct and clamp the cathode of tube 60 during the gating interval to a level corresponding to the voltage drop across the diode. This allows for a fixed bias point operation throughout the gating period to facilitate class A operation in that period.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A signal processing apparatus for a television receiver utilizing a composite color television signal having a luminance signal representing brightness information of an image, having a chroma signal modulated with color information of said image, and having a color sync signal in the form of periodically recuring bursts of energy of a reference frequency corresponding to the fundamental frequency of said chroma signal, said apparatus comprising:

a color demodulator for demodulating said chroma signal having a tuned input circuit, including a coil, resonant to said reference frequency;

a network resonant at said reference frequency, including a piezoelectric crystal having a ringing frequency corresponding to said reference frequency and further including a coil in shunt to said crystal and inductively coupled to said demodulator coil;

a gated burst amplifier having an input circuit for receiving said composite signal and having an output circuit including said resonant network;

and means for gating said amplifier to apply only said color sync signal to said crystal, and said crystal having a Q sufficiently high to develop, in response to periodic excitation by said color sync signal, a reference signal which is frequency synchronized and phase locked to said color sync signal and is of substantially constant amplitude throughout the intervals between said recurring bursts.

2. A signal processing apparatus in accordance with claim 1 in which said resonant circuit exhibits a spurious resonance at a frequency other than said resonant frequency and in which said network further includes a circuit which is resonant at said other frequency and is critically damped.

3. A signal processing apparatus in accordance with claim 1 in which said burst amplifier has one electrode common to said input and output circuits, and in which said gating means comprises means for applying gating pulses to said common electrode in time coincidence with said color sync signal.

4. A signal processing apparatus in accordance with claim 3 in which an automatic chroma control system is coupled to said resonant circuit to rectify said reference signal and develop a control potential, and further in which said gating means includes means for gating said system off at least for the gated-on duration of said burst amplifier.

5. A signal processing apparatus in accordance with claim 3 including a single stage chroma amplifier for receiving said chroma signal and said color sync signal, having a tuned output circuit resonant at said reference frequency and inductively coupled to said demodulator for applying said chroma signal thereto and further coupled to said input circuit of said gated amplifier for applying said color sync signal thereto.

References Cited

UNITED STATES PATENTS

| | | | |
|---|---|---|---|
| 3,424,999 | 1/1969 | Spies | 178—69.5 |
| 2,953,636 | 9/1960 | Kelly | 178—5.4 |
| 2,980,762 | 4/1961 | Sonnenfeldt | 178—5.4 |

ROBERT L. GRIFFIN, Primary Examiner

JOHN C. MARTIN, Assistant Examiner